Figure 3:
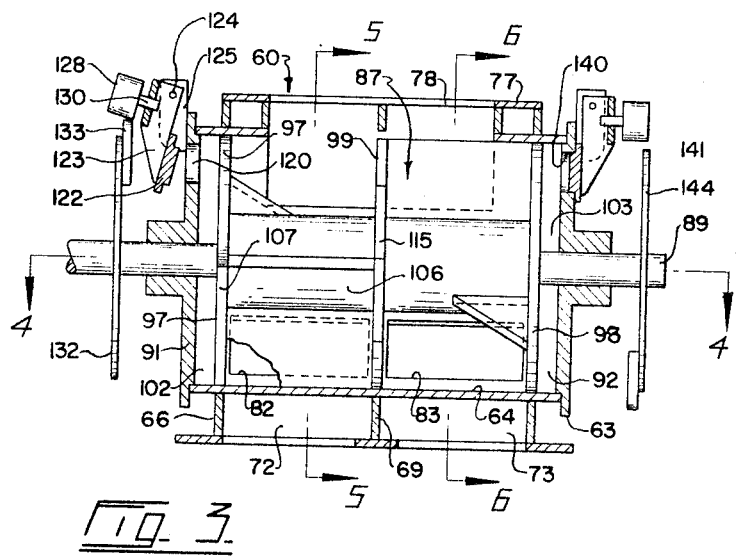

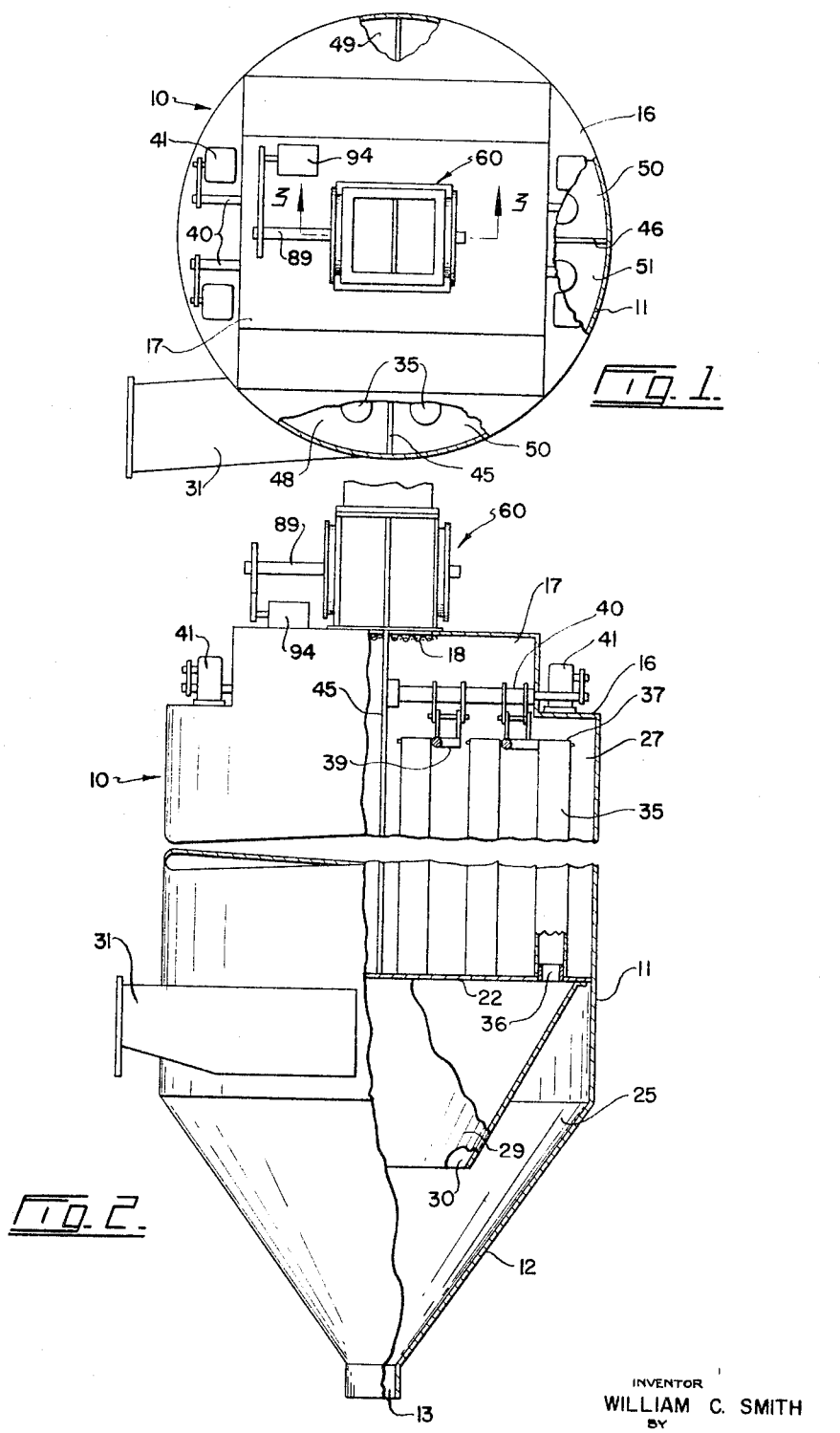

INVENTOR
WILLIAM C. SMITH
BY
Fetherstonhaugh & Co.
ATTORNEYS

Aug. 30, 1966  W. C. SMITH  3,269,096
BACK-WASH VALVE FOR GAS-SOLID SEPARATING APPARATUS
Filed July 12, 1963  4 Sheets-Sheet 3
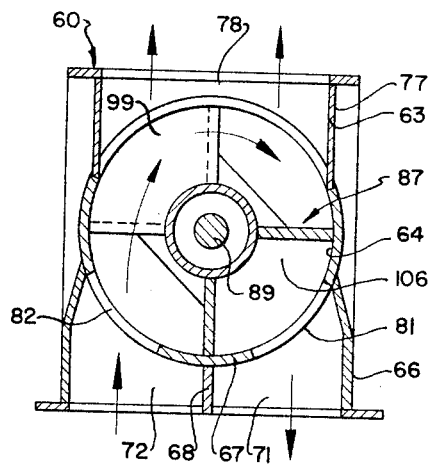
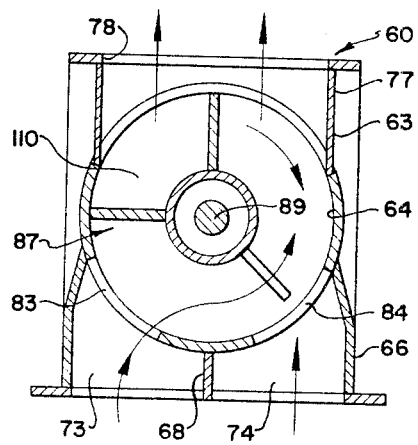
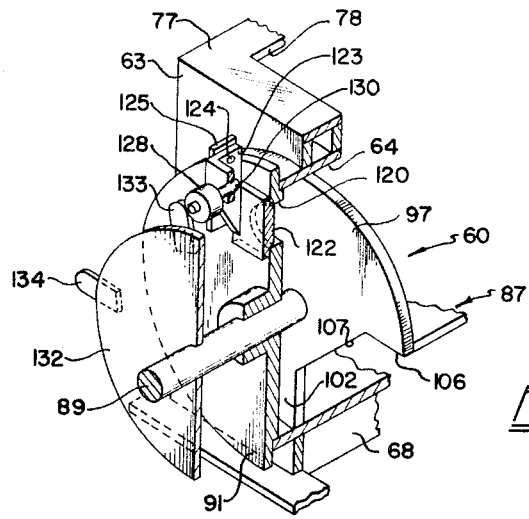
INVENTOR
WILLIAM C. SMITH
BY
Fetherstonhaugh & Co.
ATTORNEYS

INVENTOR
WILLIAM C. SMITH

United States Patent Office 3,269,096
Patented August 30, 1966

3,269,096
BACK-WASH VALVE FOR GAS-SOLID
SEPARATING APPARATUS
William C. Smith, North Vancouver, British Columbia,
Canada, assignor to Rader Pneumatics & Engineering
Co. Ltd., Vancouver, British Columbia, Canada, a corporation of British Columbia, Canada
Filed July 12, 1963, Ser. No. 294,621
8 Claims. (Cl. 55—302)

This invention relates to back-wash valves for apparatus used to separate particles from air or gases, such as in pneumatic conveying systems.

This apparatus is designed to separate particle material, such as flour, cement, grain and the like, from air or other gases. For example, when the products are conveyed in a pneumatic conveyor system, it is necessary to separate them from the air when they arrive at their destination. This apparatus may be the original separator, or any high-efficiency separator apparatus may originally be used to separate the products from the air, and then the present apparatus used to separate out any products may have been carried by the air out of the original separator.

The separating apparatus includes a cyclone section into which the air carrying the product is tangentially directed. The heavy particles are separated by centrifugal action and are directed out of the bottom of the apparatus. The separated air travels upwardly in the apparatus, and usually carries some light particles with it. This air travels through filters and, in order to reduce clogging of the filters, the filters are usually in the form of a plurality of vertical tubes formed of filter material, said tubes being closed at their upper ends and being periodically cleaned by a suitable cleaning mechanism. The air is then discharged from the apparatus.

The difficulty with the prior art apparatus results from the fact that the filter tubes tend quickly to become clogged, and therefore it is necessary frequently to shut the apparatus down in order to clean them.

The present invention overcomes this difficulty by providing a back-wash valve at the air discharge of the apparatus described above. In addition to this, the filter tubes are arranged in a plurality of sections within the apparatus, independent of each other, but opening into the cyclone section of the apparatus. All tube sections are most of the time in communication with the suction means which draws the air through the apparatus, but the sections are successively and for short intervals cut off from the suction means, and each cut-off section is brought into communication with the atmosphere outside the apparatus. This results in outside air being drawn downwardly through the cut-off tube section so that the air passes through the walls of the tube in the opposite direction to the normal travel of air through said walls and carries particles clinging to the inner surface of said tube walls down into the cyclone section. The back-wash valve can be operated intermittently, but it usually operates continuously so that the tube sections are one after the other cleaned out in this manner without interfering with the operation of the recovery apparatus.

Figure 4:
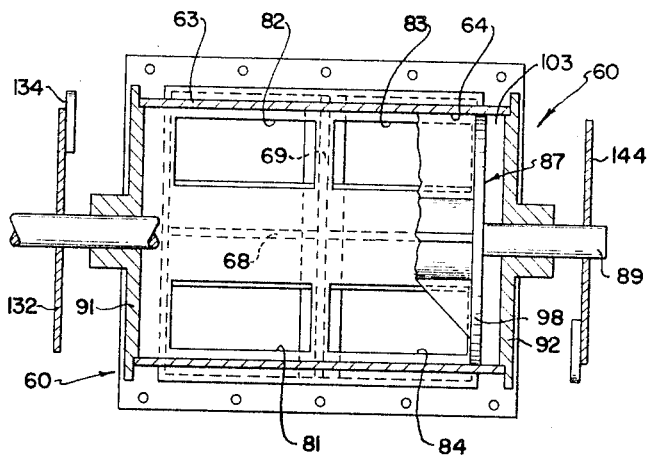
Figure 8:
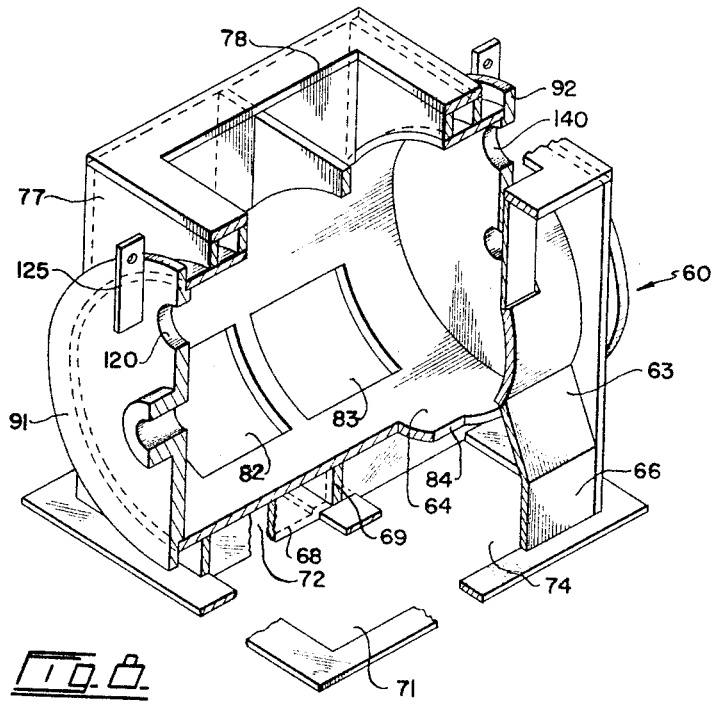
Figure 9:
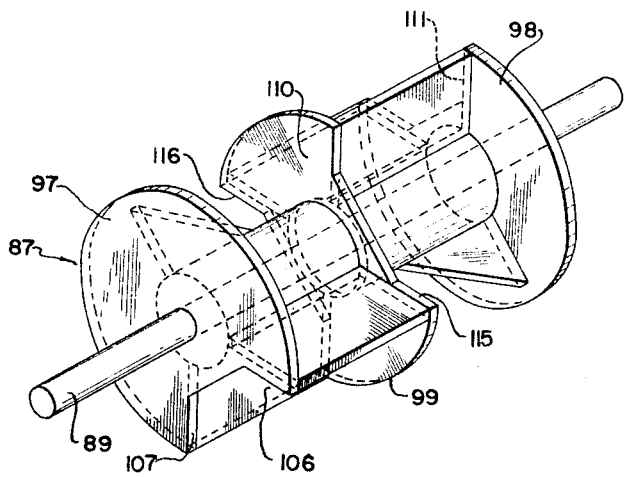

A preferred form of this invention is illustrated in the accompanying drawings, in which, FIGURE 1 is a plan view of separating apparatus with a back-wash valve according to this invention thereon with some parts broken away, FIGURE 2 is a side elevation of the apparatus, partly in section, FIGURE 3 is an enlarged vertical section through the back-wash valve taken on the line 3—3 of FIGURE 1, FIGURE 4 is a horizontal section through the valve taken on the line 4—4 of FIGURE 3, FIGURES 5 and 6 are vertical sections through the valve taken on the lines 5—5 and 6—6 of FIGURE 3, respectively, FIGURE 7 is a fragmentary perspective view of an end of the valve, showing parts of the interior thereof, FIGURE 8 is a perspective view of the valve housing with the rotary unit thereof removed, and FIGURE 9 is a perspective view of the rotary unit removed from the housing.

Referring to FIGURES 1 and 2 of the drawings, 10 is a preferred form of the separating apparatus, and this includes casing 11 having a conical bottom 12 with a discharge outlet 13 therein centrally thereof. Casing 11 is closed at its upper end by a cover 16 which is formed with a housing 17 centrally thereof, said housing having a central air outlet 18.

A horizontal wall 22 extends across casing 11 approximately midway between discharge outlet 13 and air outlet 18 to divide said casing into a cyclone section 25 at the lower end thereof and a tube section 27 opening into cover housing 17, see FIGURE 2. An annular baffle 29 in the form of an inverted truncated cone is secured to wall 22 and hangs down in cyclone section 25, the wall of said baffle extending inwardly from the wall of casing 11 and terminating in an entrance 30 centrally of the cyclone section. An inlet pipe 31 opens into the upper part of section 25 tangentially to the wall of casing 11 and opposite baffle 29.

A plurality of filter tubes 35 open at their lower ends at 36 through plate 22 and thereby communicate with cyclone section 25. The upper end 37 of each filter tube is closed and connected to a support 39 which, in turn, is connected to a shaker 40 of standard construction which is operated by a suitable power source, such as an electric motor 41. Filter tubes 35 and the shaker therefor are well known in the art.

Tube section 27 is divided by crossed walls 45 and 46 into quarter sections 48, 49, 50 and 51. Walls 45 and 46 extend from wall 22 right up to the top of housing 17 so that they divide air outlet 18 into four independent sections, one for each of the tube sections 48 to 51.

A back-wash valve 60 is mounted on top of housing 17 and communicates with air outlet 18 of casing 11. Back-wash valve 60 is illustrated in detail in FIGURES 3 to 9 of the drawings.

Valve 60 comprises a housing 63 having a horizontal cylinder 64 extending therethrough, and a lower extension 66 which has crossed walls 68 and 69 therein dividing it into inlets 71, 72, 73 and 74 which are in communication respectively with tube sections 48, 49, 50 and 51 through air outlet 18. Housing 63 has an upper extension 77 which is open at its upper end to form a common outlet 78 which, when the apparatus is in operation, is in communication with suitable suction means, not shown. The bottom portion of cylinder 64 is formed with ports 81, 82, 83 and 84 which are in communication through suitable passage means with inlets 71, 72, 73 and 74, respectively, see FIGURES 5 and 6. It will be noted that ports 81 and 82 along with inlets 71 and 72 are radially aligned relative to cylinder 64, as are ports 83 and 84 along with inlets 73 and 74.

A rotor unit 87 is rotatably mounted in cylinder 64 and is fixedly secured to a shaft 89 which is journalled in end plates 91 and 92 of housing 63. One end of shaft 89 is connected to a suitable source of power, such as an electric motor 94, see FIGURES 1 and 2.

Rotor unit 87 consists of spaced end discs 97 and 98, and an intermediate disc 99 located therebetween and spaced therefrom, see FIGURE 9. These discs radiate from shaft 89 and rotatably fit within cylinder 64. By referring to FIGURE 3 it will be seen that end discs 97 and 98 are located between ports 81–82 and ports 83–84 and housing end plates 91 and 92, respectively, to form therebetween chambers 102 and 103. Intermediate disc 99 is located at the portion of cylinder 64 between ports 81–82 and 83–84. A pocket 106 is formed between discs 97 and 99 and opens out through disc 97 at 107 to communicate with chamber 102. Similarly, another pocket 110 is formed between discs 98 and 99 and opens out through disc 98 at 111 to communicate with chamber 103. It will be noted that pockets 106 and 110 are located diametrically opposite each other with respect to rotor unit 87. Disc 99 is cut away at 115 and 116 diametrically opposite each other so that the sections of rotor unit 87 on opposite sides of disc 99 and outside of pockets 106 and 110 are in communication with each other and with housing outlet 78. Pocket 106 is aligned with ports 81–82, and is just large enough to enclose one of these ports at a time. Similarly, pocket 110 is aligned with ports 83 and 84 and is just large enough to enclose one of these ports at a time. Although chambers 102 and 103 may always be in communication with atmosphere outside valve housing 63, it is preferable to bring each chamber only intermittently into communication with the outside atmosphere. For this purpose, an outlet port 120 is formed in end plate 91 and is normally closed by a cover 122. This cover is carried by arms 123 pivotally mounted at 124 near upper ends thereof on a bracket 125 mounted and projecting outwardly from plate 91. A cam roller 128 is carried by a shaft 130 secured to and projecting outwardly from arms 123. This roller is in line with but spaced outwardly from a disc 132 fixedly mounted on shaft 89. A pair of spaced cam blocks 133 and 134 project outwardly from disc 132 and are adapted intermittently to engage roller 128 to swing arms 123 outwardly and thereby lift cover 122 away from outlet port 120.

An outlet port 140 is formed in end plate 92 and has a cover 141 which is mounted in the same manner as cover 122 and intermittently lifted away from port 140 by cam blocks projecting from a disc 144 fixedly mounted on shaft 89.

Cam blocks 133 and 134 are arranged so that port 120 is uncovered for an instant only each time pocket 106 fully and successively encloses ports 81 and 82, respectively. Similarly, port 140 is uncovered for an instant only when pocket 110 completely encloses ports 83 and 84, respectively.

During operation of apparatus 10, suction is applied to outlet 78 of the back-wash valve 60. The air containing the particles or product to be separated therefrom is directed into cyclone section 25 of casing 11 through pipe 31. The heavy particles are separated from the air in the usual manner by centrifugal action, and slide down conical bottom 12 and out through discharge outlet 13. The separated air rises centrally of casing 11 through entrance 30 of baffle 29 to pass upwardly into tubes 35 and through the walls thereof where the fine particles carried by the air are separated therefrom by the filter tubes. Some of the particles drop back down into the cyclone section, while some adhere to the walls of the tubes tending to clog the filter action thereof.

When the tube sections 48, 49, 50 and 51 are most of the time in communication with valve outlet 78 through the spaces around rotor unit 87 and outside of pockets 106 and 110. However, said tube sections are successively and for short intervals cut off from outlet 78. One tube section at a time is cut off from its normal communication with outlet 78 when one of the pockets of rotor 87 completely encloses the port of cylinder 64 which communicates with the latter tube section through the inlet of housing 63 which is always in communication with said tube section. As soon as this takes place, the outlet port of the chamber 102 or 103 which is in communication with the last-mentioned pocket is opened so that said tube section is suddenly brought into communication with the atmosphere outside the apparatus. This results in a sudden rush of air downwardly through said tube section and through the walls of the filter tubes therein in the opposite direction to the normal flow of air through said tube walls to dislodge the particle material adhering to said walls and causing it to fall back into cyclone section 25. This inrush of outside air is caused at this instant by the fact that suction is being applied to the cyclone section through the remaining three filter tube sections.

For example, when pocket 106 completely encloses port 81, filter tube section 48 is cut off from outlet 78, while the remaining three tube sections are in communication with said outlet. At this instant, cover 122 is lifted off port 120 so that outside air travels into chamber 102 and successively through pocket 106, port 81, inlet 71, outlet 18 and tube section 48. This cleans filter tubes 35 in said section 48 and causes the particles in said tubes to drop back down into cyclone section 25 where they are subjected to the usual separating action. Port 120 is immediately closed, and pocket 106 next encloses port 82 to cut tube section 49 off from the suction. Then pocket 110 consecutively encloses ports 83 and 84 to cut tube sections 50 and 51 one after the other off from the suction. Thus, filter tubes 35 are continuously cleaned without stopping or interfering with the operation of apparatus 10.

Ports 81, 82, 83 and 84 have been arranged in two separate series in the wall of cylinder 64 in order to simplify the construction of the back-wash valve. It is obvious that said ports may be arranged in a single line around the cylinder, in which case, rotary unit 87 would have only one pocket aligned with said ports. In this case, housing 63 would be formed with passages extending from the different ports to the different inlets 71, 72, 73 and 74.

Although casing 11 has been described as being divided into four sections and the back-wash valve designed accordingly, it is to be understood that the casing may be divided into any desired number of sections and the back-wash valve made in accordance therewith.

What I claim as my invention is:

1. A back-wash valve for apparatus used to separate particles from gases, comprising a rotor casing having a cylindrical wall with a plurality of independent circumferentially-spaced inlet ports therein adapted to be connected individually to a plurality of separator chambers to receive air therefrom, said casing having an outlet aligned with and circumferenitally spaced from said inlet ports and adapted to be connected to a source of suction, a rotor unit rotatably mounted within the casing and radially spaced inwardly from said cylindrical wall, opposed radial discs forming part of the rotor unit and having edges slidably engaging the cylindrical wall, said discs being axially spaced apart and positioned to enclose the inlet ports and the outlet whereby said ports are normally in communication with said outlet, an enclosing pocket on the rotor unit extending between said discs and opening out radially of the unit, said pocket being closed at one disc and opening out through the opposed disc, said pocket being large enough to enclose each inlet port as the pocket passes the latter during rotation of the rotor unit, and opening means in and opening out from the casing near said disc through which the pocket opens and in communication with said pocket when the latter moves over each inlet port.

2. A back-wash valve as claimed in claim 1 in which said casing has an end wall spaced from the rotor unit disc through which the pocket opens and forming a chamber therebetween, said opening means being in communication with said chamber and thereby always being in communication with the pocket through the chamber.

3. A back-wash valve as claimed in claim 1 including cover means normally closing said opening means, and means for moving the cover means momentarily to open the opening means when the pocket encloses each inlet port.

4. A back-wash valve as claimed in claim 2 in which said opening means is a port, and including a cover normally closing said port, and cam means adapted to rotate with the rotor unit for moving the cover momentarily to open the port when the pocket encloses each inlet port of the casing.

5. A back-wash valve as claimed in claim 4 including cover means normally closing said opening means, and means for moving the cover means momentarily to open the opening means each time a pocket encloses an inlet port.

6. A back-wash valve for apparatus used to separate particles from gases, comprising a rotor casing having a cylindrical wall with a plurality of independent inlet ports therein arranged in first and second axially spaced series, the ports of each series being circumferentially spaced and adapted to be connected individually to a plurality of separator chambers to receive air therefrom, said casing having an outlet aligned with and circumferentially spaced from said inlet ports and adapted to be connected to a source of suction, a rotor unit rotatably mounted within the casing and radially spaced inwardly from said cylindrical wall, opposed radial discs forming part of the rotor unit and having edges slidably engaging the cylindrical wall, said discs being arranged in axially spaced pairs with a pair for each series of inlet ports and positioned to enclose the inlet ports of said each series whereby said ports are normally in communication with said outlet, an enclosing pocket on the rotor unit extending between each pair of discs and opening out radially of the unit, each pocket being closed at one disc and opening out through the opposed disc of each pair of said pockets, each pocket being large enough to enclose each inlet port of the series as the pocket passes the latter inlet port during rotation of the rotor unit, and opening means in and opening out from the casing and in communication with the end of each pocket opening through a disc when the latter pocket moves over each inlet port.

7. A back-wash valve as claimed in claim 6 in which the pairs of discs of the rotor unit are formed by two axially spaced end discs with a common disc therebetween, said pockets open out through the end discs, and said casing has an end wall spaced from each end disc and forming a chamber therebetween, said opening means being in communication with each chamber and thereby always being in communication with the pockets through said chambers.

8. A back-wash valve as claimed in claim 7 in which said opening means comprises a port for each chamber, and including a cover for each chamber port normally closing the latter port, and cam means for each cover adapted to rotate with the rotor unit for moving said each cover momentarily to open the chamber port thereof each time the pocket opening into the chamber of the latter port encloses an inlet port.

References Cited by the Examiner

UNITED STATES PATENTS

| | | | |
|---|---|---|---|
| 1,628,601 | 5/1927 | Feind | 55—303 |
| 3,097,938 | 7/1963 | Weller | 55—302 |

OTHER REFERENCES

Sauermann; German printed application No. 1,131,074, June 1962.

HARRY B. THORNTON, *Primary Examiner*.